US011490455B2

(12) United States Patent
Sano et al.

(10) Patent No.: US 11,490,455 B2
(45) Date of Patent: Nov. 1, 2022

(54) USER EQUIPMENT AND BASE STATION

(71) Applicant: NTT DOCOMO, INC., Tokyo (JP)

(72) Inventors: Yousuke Sano, Tokyo (JP); Kazuki Takeda, Tokyo (JP); Kazuaki Takeda, Tokyo (JP); Daiki Takeda, Tokyo (JP); Daisuke Murayama, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/344,501

(22) PCT Filed: Oct. 31, 2017

(86) PCT No.: PCT/JP2017/039225
§ 371 (c)(1),
(2) Date: Apr. 24, 2019

(87) PCT Pub. No.: WO2018/084126
PCT Pub. Date: May 11, 2018

(65) Prior Publication Data
US 2019/0246453 A1 Aug. 8, 2019

(30) Foreign Application Priority Data
Nov. 2, 2016 (JP) .............................. JP2016-215712

(51) Int. Cl.
*H04W 88/06* (2009.01)
*H04W 48/12* (2009.01)
(Continued)

(52) U.S. Cl.
CPC ........... *H04W 88/06* (2013.01); *H04L 5/0082* (2013.01); *H04L 5/1469* (2013.01); *H04W 28/06* (2013.01);
(Continued)

(58) Field of Classification Search
CPC ..... H04W 88/06; H04W 28/06; H04W 72/04; H04W 48/12; H04W 74/0833;
(Continued)

(56) References Cited

U.S. PATENT DOCUMENTS

2017/0311315 A1* 10/2017 Islam ................... H04L 27/2646
2018/0049244 A1* 2/2018 Lee ....................... H04W 76/27
(Continued)

FOREIGN PATENT DOCUMENTS

EP 2955966 A1 12/2015

OTHER PUBLICATIONS

Rico-Alvarino et al., "An Overview of 3GPP Enhancements on Machine to Machine Communications", Jun. 2016, IEEE Communications Magazine (Year: 2016).*
(Continued)

*Primary Examiner* — Justin T Van Roie
(74) *Attorney, Agent, or Firm* — Osha Bergman Watanabe & Burton LLP

(57) ABSTRACT

Disclosed is a scheme of transmitting various types of radio signals for which interference between adjacent cells is considered in a radio communication system (for example, dynamic TDD) in which uplink communication and downlink communication can be dynamically switched. A feature of the present invention relates to user equipment including a transceiver that performs transmission and reception of a radio signal with a base station in accordance with a communication scheme in which uplink communication and downlink communication are dynamically switched and a signal processor that processes the radio signal, wherein the transceiver transmits a connection request signal generated by the signal processor in fixed uplink radio resources of the communication scheme.

2 Claims, 13 Drawing Sheets

(51) Int. Cl.
  H04W 74/08    (2009.01)
  H04L 5/14     (2006.01)
  H04L 5/00     (2006.01)
  H04W 72/04    (2009.01)
  H04W 28/06    (2009.01)

(52) U.S. Cl.
  CPC ......... H04W 48/12 (2013.01); H04W 72/04 (2013.01); H04W 72/0446 (2013.01); H04W 74/0833 (2013.01)

(58) Field of Classification Search
  CPC ............ H04W 72/0446; H04L 5/1469; H04L 5/0082; H04L 5/0096
  See application file for complete search history.

(56) References Cited

U.S. PATENT DOCUMENTS

| | | | | |
|---|---|---|---|---|
| 2018/0160379 | A1* | 6/2018 | Yokomakura | H04W 52/365 |
| 2018/0213531 | A1* | 7/2018 | Kim | H04L 1/1812 |
| 2018/0279351 | A1* | 9/2018 | Shimezawa | H04L 5/0094 |
| 2019/0280837 | A1* | 9/2019 | Sano | H04W 72/0446 |

OTHER PUBLICATIONS

Martin Kasparick et al., "Bi-orthogonal Waveforms for 5G Random Access with Short Message Support", European Wireless 2014, VDE VERLAG GMBH, Berlin, Offenback, Germany (Year: 2014).*
International Search Report issued in PCT/JP2017/039225 dated Jan. 16, 2018 (10 pages).
Written Opinion of the International Searching Authority issued in PCT/JP2017/039225 dated Jan. 16, 2018 (7 pages).
3GPP TS 36.211 V14.0.0; "3rd Generation Partnership Project; Technical Specification Group Radio Access Network Evolved Universal Terrestrial Radio Access (E-UTRA); Physical channels and modulation (Release 14)"; Sep. 2016 (170 pages).
3GPP TS 36.213 V14.0.0; "3rd Generation Partnership Project; Technical Specification Group Radio Access Network Evolved Universal Terrestrial Radio Access (E-UTRA); Physical layer procedures (Release 14)"; Sep. 2016 (406 pages).
CATT; "Further discussion on TDD eIMTA"; 3GPP TSG RAN WG2 Meeting #84, R2-134430; San Francisco, USA; Nov. 11-15, 2013 (4 pages).
MediaTek Inc.; "RAN2 Impact of Supporting eIMTA"; 3GPP TSG-RAN2 #84 Meeting, R2-134068; San Francisco, USA; Nov. 11-15, 2013 (6 pages).
Huawei, HiSilicon; "General discussion on flexible duplex"; 3GPP TSG RAN WG1 Meeting #86bis, R1-1609421; Lisbon, Portugal; Oct. 10-14, 2016 (5 pages).
Nokia Corporation, Nokia Siemens Networks; "Discussion on Methods to support different time scales for TDD UL-DL reconfiguration"; 3GPP TSG-RAN WG1 Meeting #69, R1-122435; Prague, Czech Republic; May 21-25, 2012 (4 pages).
Extended European Search Report issued in counterpart European Patent Application No. 17866907.3, dated May 27, 2020 (7 pages).
InterDigital Communications; "eIMTA Configuration and Operation"; 3GPP TSG-RAN WG2 #84, Tdoc R2-134228; San Francisco, USA; Nov. 11-15, 2013 (8 pages).
Notice of Reasons for Refusal for counterpart Japanese Patent Application No. 2018-549002 dated Aug. 17, 2021 (6 pages).

* cited by examiner

EXAMPLE OF DYNAMIC TDD

DL/UL PATTERN IS APPLIED
INDIVIDUALLY FOR EACH CELL
(DL/UL CAN BE MODIFIED IN ACCORDANCE
WITH REQUIRED TRAFFIC AT THAT TIME)

EXAMPLE OF STATIC TDD

DL/UL PATTERN COMMON
TO ALL CELLS IS USED
(DL/UL IS DEFINED IN ADVANCE)

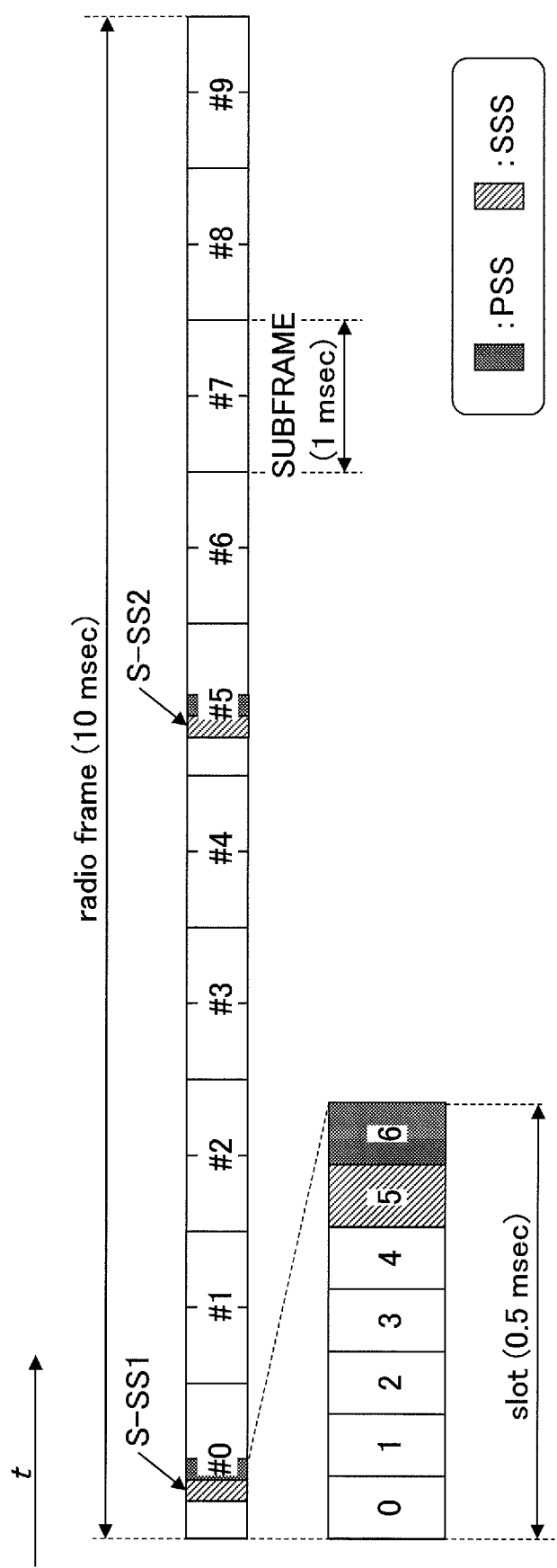

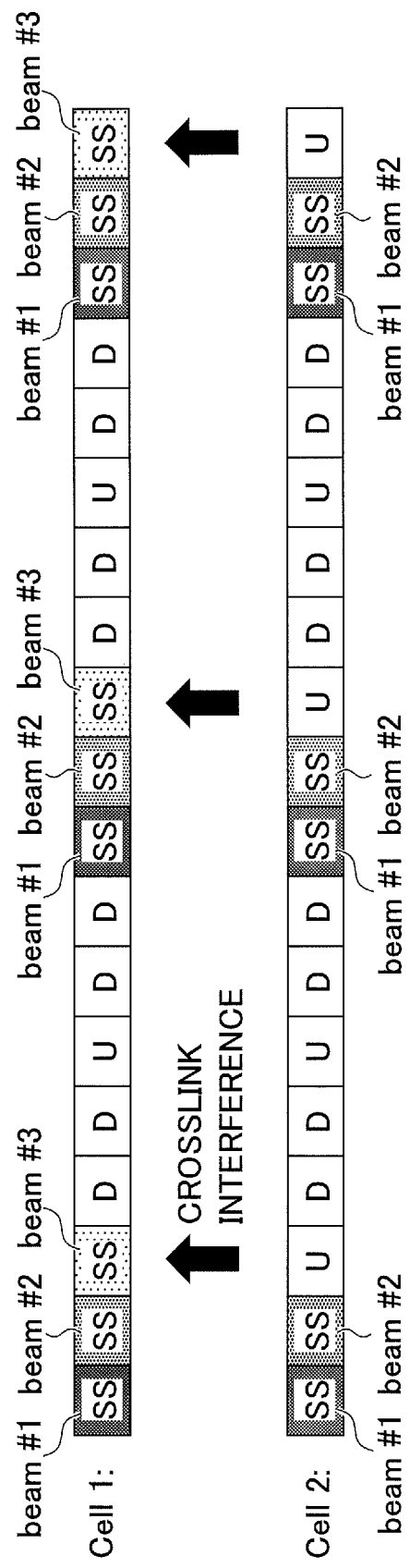

FIG.7

PATTERN 1: UL/DL CAN BE CONTROLLED IN ALL SUBFRAMES/SLOTS/MINI-SLOTS

E.g., subframe, slot or Mini-slot

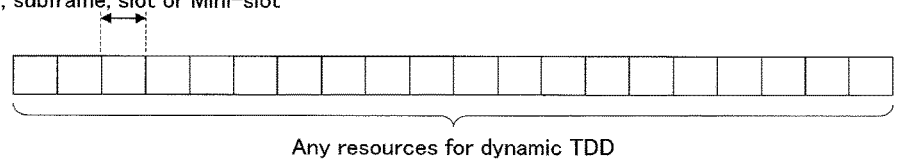

Any resources for dynamic TDD

PATTERN 2: UL/DL CAN BE CHANGED IN SECTION OTHER THAN SOME SUBFRAMES/SLOTS/MINI-SLOTS

E.g., subframe, slot or Mini-slot

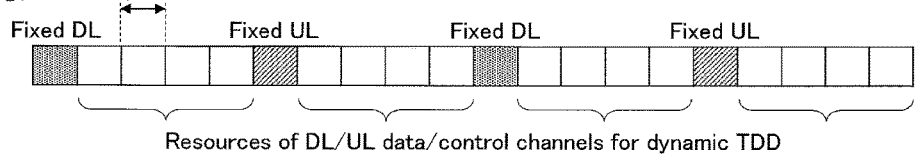

Resources of DL/UL data/control channels for dynamic TDD

PATTERN 3: UL/DL CAN BE CONTROLLED IN SOME SUBFRAMES/SLOTS/MINI-SLOTS AND SECTION OTHER THAN CERTAIN SECTION IN SUBFRAMES/SLOTS/MINI-SLOTS

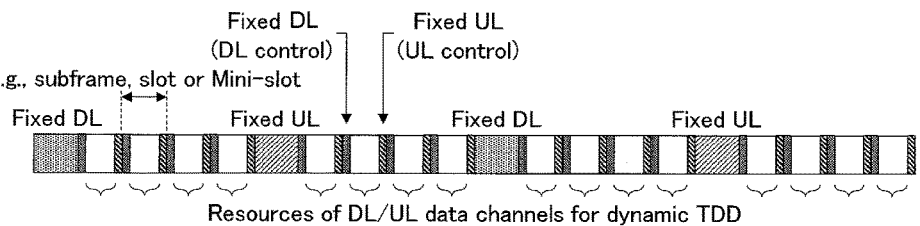

Resources of DL/UL data channels for dynamic TDD

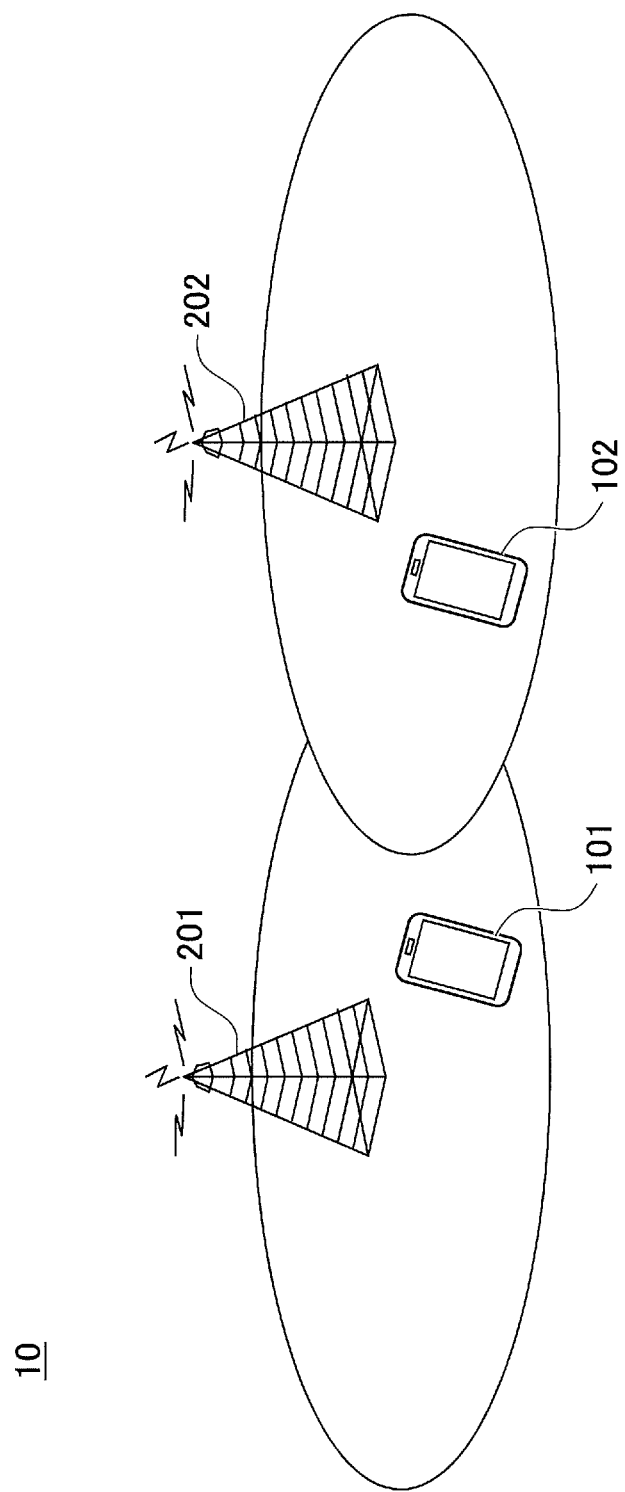

FIG.11
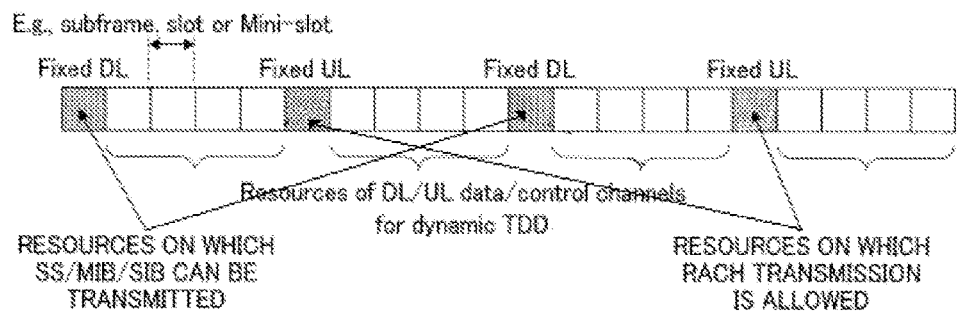
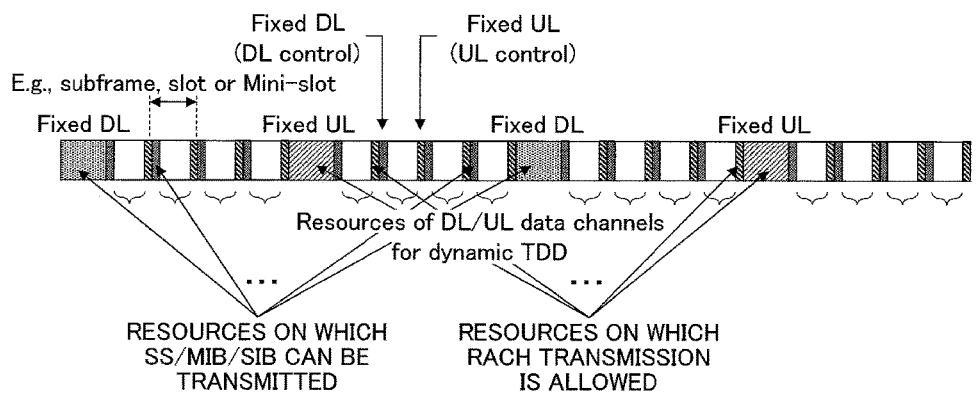

USER EQUIPMENT AND BASE STATION

TECHNICAL FIELD

The present invention relates to a radio communication system.

BACKGROUND ART

In third generation partnership project (3GPP), next generation communication standards (5G or NR) of long term evolution (LTE) and LTE-advanced have been discussed. In the NR system, flexible duplex has been studied in which resources used for downlink communication and uplink communication are flexibly controlled in accordance with downlink traffic and uplink traffic to be generated. For example, dynamic time division duplex (TDD) has been studied in which uplink resources and downlink resources are dynamically switched in the time domain. Additionally, a scheme in which switching is performed in a frequency domain and full duplex in which uplink communication and downlink communication are simultaneously performed using the same resources have been studied. In the following, an example of dynamic TDD is described for simplicity of the description. The same applies to other schemes. For dynamic TDD, typically, a deviation between downlink traffic and uplink traffic becomes greater in a small cell, compared to that of a large cell. Accordingly, by controlling downlink communication and uplink communication individually using dynamic TDD in each cell, traffic can be accommodated more efficiently.

In the dynamic TDD, downlink and uplink communication directions are dynamically switched at certain time intervals, such as a single subframe, a single slot, a single mini-slot, or a plurality of subframes, a plurality of slots, or a plurality of mini-slots. Namely, as illustrated in FIG. 1A, in static TDD applied to LTE, preconfigured downlink/uplink patterns are used, which are common to cells. In contrast, in dynamic TDD, as illustrated in FIG. 1B, downlink/uplink patterns dedicated for respective cells are used. Accordingly, in each cell, downlink and uplink communication directions can be dynamically switched depending on a downlink traffic amount and an uplink traffic amount.

In contrast, in the NR system, various types of downlink and uplink signals are expected to be used, such as a synchronization signal, a broadcast signal, a random access channel (RACH) signal, etc. For example, in LTE system, synchronization signals for cell detection and synchronization are mapped onto radio resources, as illustrated in FIG. 2. In LTE, two types of synchronization signals are transmitted, which are a primary synchronization signal (PSS) and a secondary synchronization signal (SSS). Transmission periodicities for transmitting synchronization signals differ between frequency division duplex (FDD) and time division duplex (TDD). The depicted example is for a case of FDD, and synchronization signals are transmitted by the depicted mapping with a periodicity of 5 milliseconds.

Furthermore, a broadcast signal is a cell specific operation parameter that is required for all units of user equipment (UE) to commonly obtain or minimum information required for connection, and a master information block (MIB) and a system information block (SIB) are used for LTE. In LTE, after a cell search is performed based on the synchronization signal, user equipment receives the MIB and the SIB transmitted with transmission periodicities, such as those illustrated in FIGS. 3 and 4. As illustrated in FIG. 3, the MIB is transmitted through a physical broadcast channel (PBCH) four times per 10 milliseconds (with a periodicity of 40 milliseconds). The SIB is transmitted through a physical downlink shared channel (PDSCH), and transmission periodicities of SIBs differ in accordance with transmitted information. For example, an SIB1 including information indicating whether it is allowed to be served is transmitted four times per 20 milliseconds (with a periodicity of 80 milliseconds) as illustrated in FIG. 4.

An RACH signal is a channel used when a user equipment that has not established a connection with a base station notifies the base station of a connection request signal. In LTE, in a physical random access channel (PRACH) as illustrated in FIG. 5A, the user equipment can transmit the RACH signal (an RACH preamble). FIG. 5A is an example, and a transmission periodicity and a radio resource in a frequency domain are indicated to user equipment by a higher layer signal. In a contention-based RACH procedure, user equipment establishes a connection with a base station through communication, such as that illustrated in FIG. 5B, and the user equipment can transmit uplink data.

PRIOR ART DOCUMENT

Non-Patent Document

Non-Patent Document 1: 3GPP TS36.211 V14.0.0 (2016 September)

Non-Patent Document 2: 3GPP TS36.213 V14.0.0 (2016 September)

SUMMARY OF THE INVENTION

Problem to be Solved by the Invention

In a radio communication system in which resources used for downlink communication and uplink communication can be flexibly controlled (for example, dynamic TDD), transmission directions may differ between adjacent cells for some radio resources. In this case, as interference from the adjacent cell, two types of interferences are expected, that is, interference from a transmitter of the adjacent cell performing transmission in the same direction as a desired signal from a transmitter of the cell and interference from the transmitter of the adjacent cell performing transmission in a direction different from the desired signal from the transmitter of the cell (crosslink interference). For example, when beamforming (particularly, analog beamforming) is applied, there is a possibility that a transmitter may transmit a synchronization signal, a broadcast signal and/or a RACH signal in contiguous radio resources (subframes, slots, mini slots, etc.) in time division duplexing. For example, as illustrated in FIG. 6, when the base station contiguously transmits the synchronization signals in a cell 1 with different beam patterns, the cross link interference may occur due to uplink transmission from an adjacent cell 2. In this case, the accuracy of the cell search may lowered. Similarly, when a broadcast signal and a RACH signal are transmitted, decoding accuracy of the broadcast signal and detection accuracy of the RACH signal may deteriorate.

In view of the above-described problem, an object of the present invention is to provide a scheme of transmitting various types of radio signals for which interference between adjacent cells is considered in a radio communication system (for example, dynamic TDD) in which uplink communication and downlink communication can be dynamically switched.

Means for Solving the Problem

In order to solve the above-described problem, an aspect of the present invention relates to user equipment including a transceiver that performs transmission and reception of a radio signal with a base station in accordance with a communication scheme in which uplink communication and downlink communication are dynamically switched; and a signal processor that processes the radio signal, wherein the transceiver transmits a connection request signal generated by the signal processor in a fixed uplink radio resource in the communication scheme.

Advantage of the Invention

According to the present invention, a scheme of transmitting various types of radio signals can be provided for which interference between adjacent cells is considered in a radio communication scheme in which uplink communication and downlink communication can be dynamically switched (e.g., dynamic TDD).

BRIEF DESCRIPTION OF DRAWINGS

FIG. 2 is a schematic diagram illustrating a mapping example of a synchronization signal in LTE;

FIG. 6 is a schematic diagram illustrating an interference pattern assumed in dynamic TDD;

FIG. 7 is a schematic diagram illustrating an UL/DL pattern of dynamic TDD according to one embodiment of the present invention;

FIG. 8 is a schematic diagram illustrating a radio communication system according to one embodiment of the present invention;

FIG. 11 is a schematic diagram illustrating mapping of a cell residing information signal and a connection request signal in dynamic TDD according to a first embodiment of the present invention;

EMBODIMENTS OF THE INVENTION

Figure 1B:
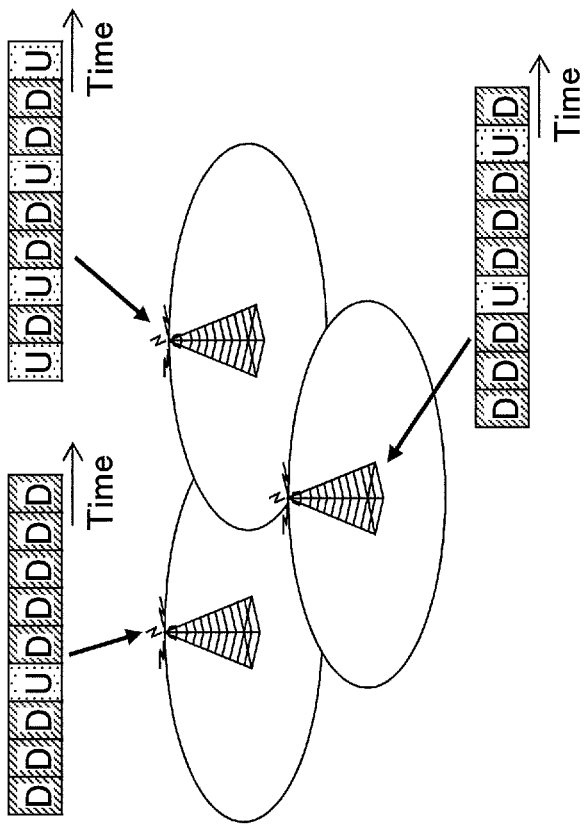
FIGS. 1A and 1B are schematic diagrams illustrating a specific example of static TDD and dynamic TDD.
Figure 1A:
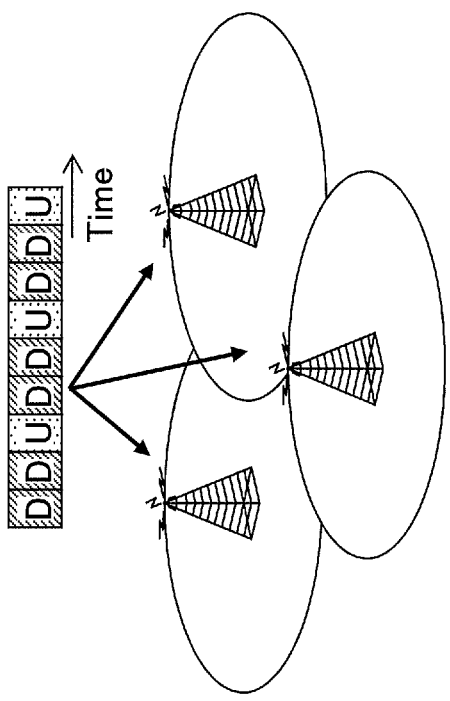
Figure 3:
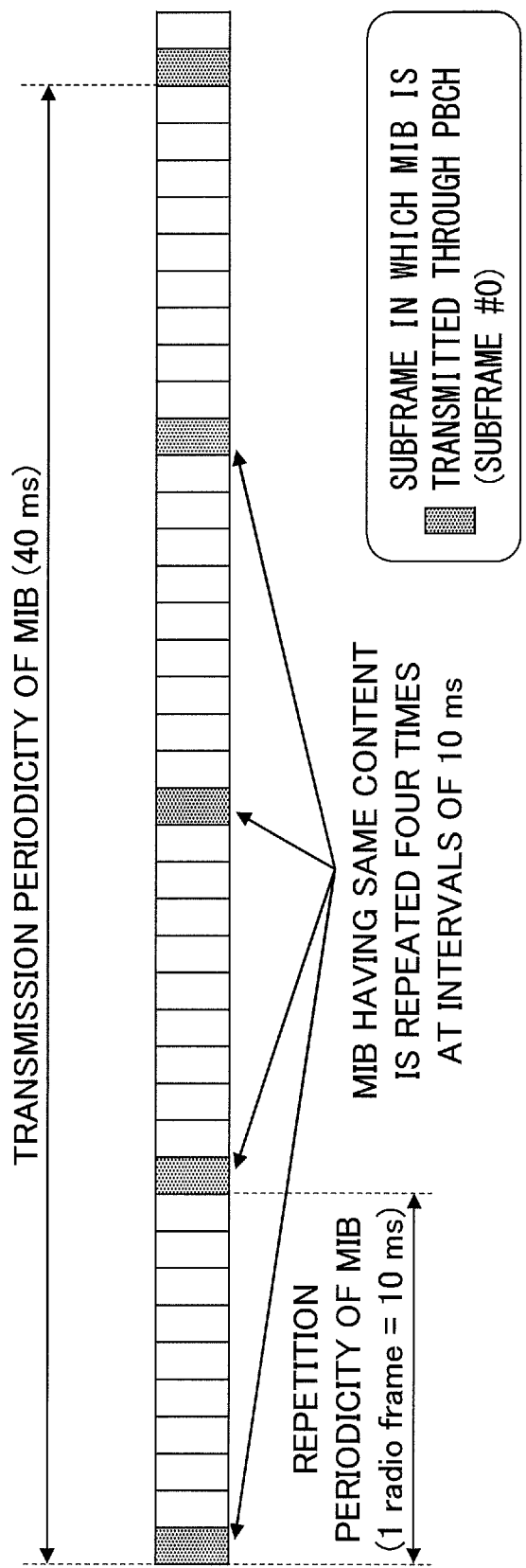
FIG. 3 is a schematic diagram illustrating a mapping example of a MIB in LTE.
Figure 4:
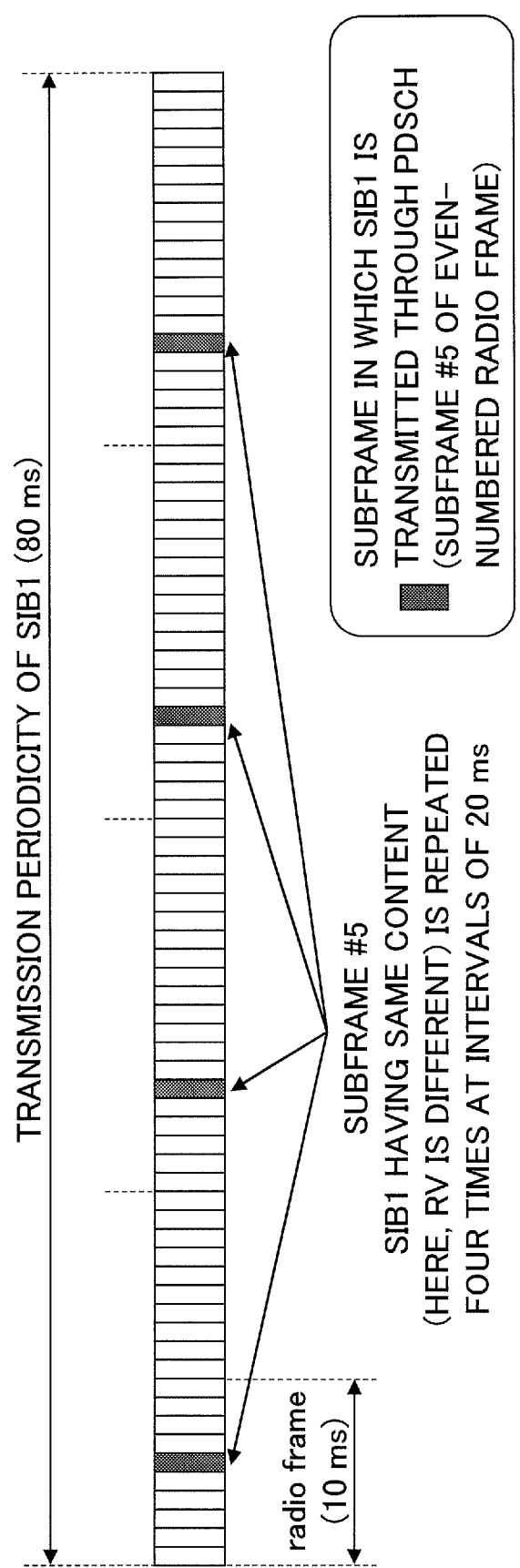
FIG. 4 is a schematic diagram illustrating a mapping example of a SIB in LTE.

In the following, exemplary embodiments of the present invention are described with reference to the appended drawings.

In the following embodiments, a radio communication system to which dynamic TDD is applied is disclosed as an example of a radio communication system in which resources used for downlink communication and uplink communication can be dynamically controlled. However, the present invention is not limited to the dynamic TDD and may be applied to other schemes (for example, a scheme (dynamic FDD) in which uplink resources and downlink resources are switched in the frequency domain or full duplex in which uplink transmission and downlink transmission are performed using the same resources). In the dynamic TDD, for example, as illustrated in FIG. 7, uplink and downlink communications are assumed to be performed in accordance with several uplink/downlink patterns. However, it is an example, and the present invention is not limited thereto. In a pattern 1 illustrated in FIG. 7, the uplink/downlink communication can be performed in all time intervals. In a pattern 2, the uplink/downlink communication is fixedly configured in some time intervals, and only a configured communication direction is permitted in the corresponding time intervals. In contrast, in other time intervals, the uplink/downlink communication can be performed. In a pattern 3, the uplink/downlink communication is fixedly configured in some time intervals and certain intervals within the time interval (in the example illustrated in FIG. 7, both end sections within the time interval are fixedly configured for downlink communication and uplink communication), and only the configured communication direction is permitted in the corresponding time intervals. In contrast, in other time intervals, the uplink/downlink communication can be performed. In one embodiment, the reference signal is transmitted in uplink or downlink radio resources which are fixedly configured in the patterns 2 and 3. In another embodiment, in order to prevent the crosslink interference, a cell residing information signal and/or a connection request signal is transmitted in radio resources muted in an adjacent cell. Accordingly, it is possible to reliably transmit the cell residing information signal and the connection request signal which are required to be transmitted and received with a high degree of accuracy. When the radio resources are muted, other signals (for example, data signals) may be rate-matched or punctured.

First, a radio communication system according to one embodiment of the present invention is described with reference to FIG. 8. FIG. 8 is a schematic diagram illustrating the radio communication system according to one embodiment of the present invention.

As illustrated in FIG. 8, a radio communication system 10 includes user equipment 101 and user equipment 102 (hereinafter, referred to collectively as a "user equipment 100") and base stations 201 and 202 (hereinafter, referred to collectively as "base station 200"). In the following embodiment, the radio communication system 10 is a radio communication system conforming to a standard on and subsequent to Rel-14 of 3GPP. However, the present invention is not limited to this, and the radio communication system 10 may be any other radio communication system to which dynamic TDD is applied.

The user equipment 100 is any appropriate information processing device having a radio communication function such as a smartphone, a mobile phone, a tablet, a wearable terminal, a machine-to-machine (M2M) communication module, or the like, and is wirelessly connected to the base station 200 and uses various kinds of communication services provided in the radio communication system 10.

The base station 200 provides one or more cells and performs radio communication with the user equipment 100.

Only one base station 200 is illustrated in the illustrated embodiment, but generally, a plurality of base stations 200 are arranged to cover a service area of the radio communication system 10.

Figure 9:
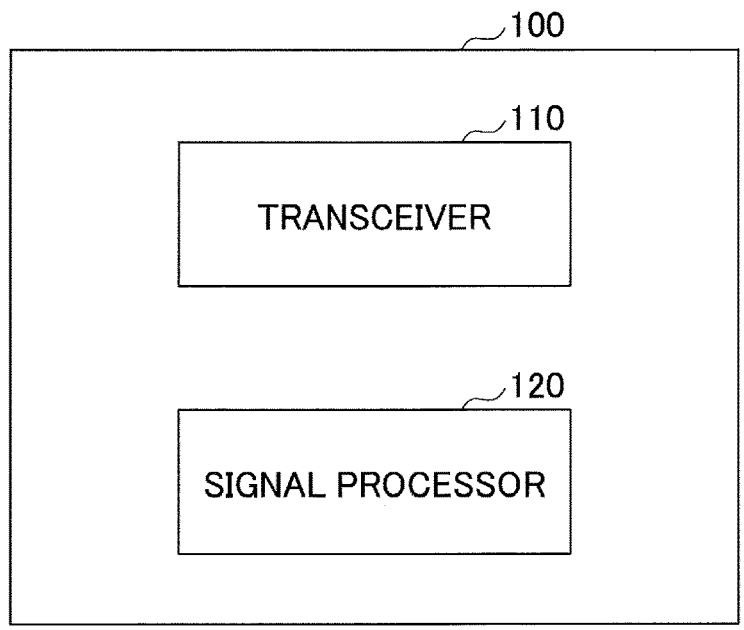
FIG. 9 is a block diagram illustrating a functional configuration of a user equipment according to one embodiment of the present invention.

Next, the user equipment according to one embodiment of the present invention is described with reference to FIG. 9. FIG. 9 is a block diagram illustrating a functional configuration of the user equipment according to one embodiment of the present invention.

As illustrated in FIG. 9, the user equipment 100 is provided with a transceiver 110 and a signal processor 120.

The transceiver 110 performs transmission and reception of a radio signal with the base station 200 in accordance with a communication scheme in which the uplink communication and the downlink communication are dynamically switched. An example of the communication scheme is the dynamic TDD in which the uplink communication and the downlink communication are dynamically switched in the time domain. Specifically, the transceiver 110 dynamically switches the downlink communication and the uplink communication at predetermined time intervals in accordance with the dynamic TDD, and transmits and performs transmission and reception of an uplink signal and a downlink signal. Here, the time interval may be any appropriate time interval such as a subframe, a slot, a mini slot, or the like.

The signal processor 120 processes the radio signal. Specifically, the signal processor 120 generates an uplink signal to be transmitted to the base station 200, and provides the generated uplink signal to the transceiver 110. In the present embodiment, as described below, the signal processor 120 maps a connection request signal (the RACH signal or the like) to radio resources for uplink transmission or mutes some radio resources. In contrast, when the transceiver 110 receives a downlink signal from the base station 200, the signal processor 120 processes the downlink signal provided from the transceiver 110 and the signal processor 120 belongs to the cell or attaches to the cell based on the received cell residing information signal (the synchronization signal, the broadcast signal, or the like). A specific process of the signal processor 120 is described below in detail.

Figure 10:
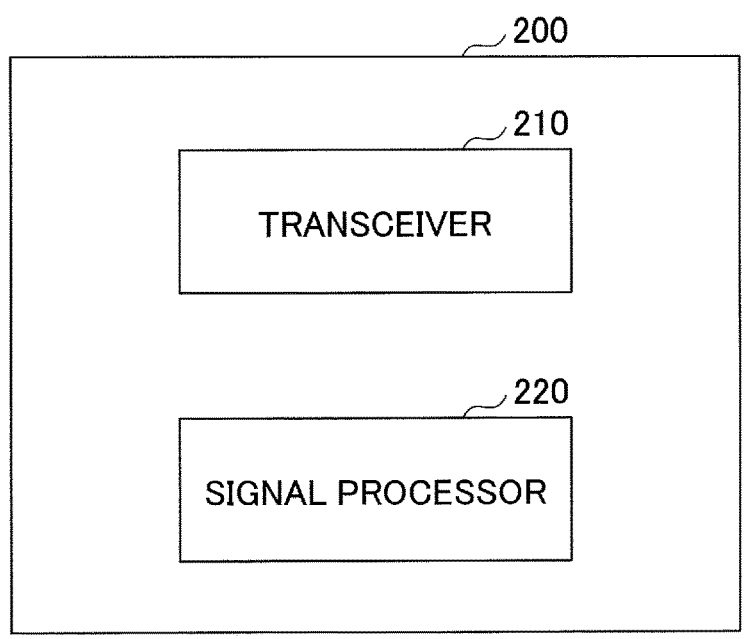
FIG. 10 is a block diagram illustrating a functional configuration of a base station according to one embodiment of the present invention.

Next, the base station according to one embodiment of the present invention is described with reference to FIG. 10. FIG. 10 is a block diagram illustrating a functional configuration of the base station according to one embodiment of the present invention.

As illustrated in FIG. 10, the base station 200 is provided with a transceiver 210 and a signal processor 220.

The transceiver 210 performs transmission and reception of the radio signal with the user equipment 100 in accordance with a communication scheme dynamically switching uplink communication and downlink communication. An example of the communication scheme is the dynamic TDD in which the uplink communication and the downlink communication are dynamically switched in the time domain. Specifically, the transceiver 210 dynamically switches the downlink communication and the uplink communication at predetermined time intervals in accordance with the dynamic TDD, and performs transmission and reception of the uplink signal and the downlink signal. Here, the time interval may be any appropriate time interval such as a subframe, a slot, a mini slot, or the like.

The signal processor 220 processes the radio signal. Specifically, the signal processor 220 generates the downlink signal to be transmitted to the user equipment 100, and provides the generated downlink signal to the transceiver 210. In the present embodiment, as described below, the signal processor 220 maps the cell residing information signal (the synchronous signal, the broadcast signal, or the like) to radio resources for downlink transmission or mutes some radio resources. When the transceiver 210 receives the uplink signal from the user equipment 100, the signal processor 220 processes the uplink signal provided from the transceiver 210 and performs the RACH procedure with the user equipment 100 in response to the received connection request signal (such as the RACH signal). A specific process of the signal processor 220 is described below in detail.

Next, mapping of the cell residing information signal and the connection request signal in the dynamic TDD according to a first embodiment of the present invention are described with reference to FIG. 11. In the first embodiment, the cell residing information signal and/or the connection request signal are transmitted in the fixedly configured uplink and/or downlink radio resources such as the uplink/downlink patterns 2 and 3 in the dynamic TDD described above with reference to FIG. 7.

FIG. 11 is a schematic diagram illustrating the mapping of the cell residing information signal and the connection request signal in the dynamic TDD according to the first embodiment of the present invention. As illustrated 11, in the first embodiment, the user equipment 100 transmits the connection request signal to the base station 200 in the fixed uplink radio resources in the dynamic TDD. The base station 200 transmits the cell residing information signal to the user equipment 100 in the fixed downlink radio resources in the dynamic TDD.

Figure 5A:
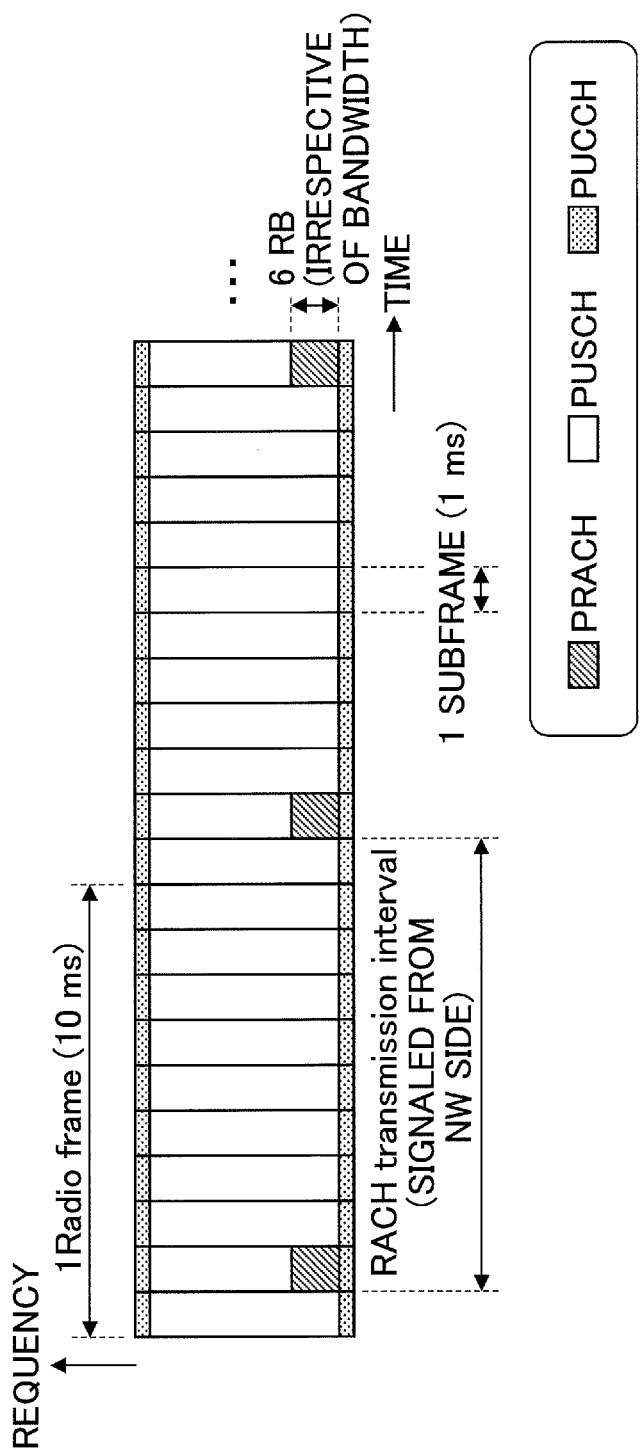
FIGS. 5A and 5B are schematic diagrams illustrating a mapping example of an RACH in LTE.
Figure 5B:
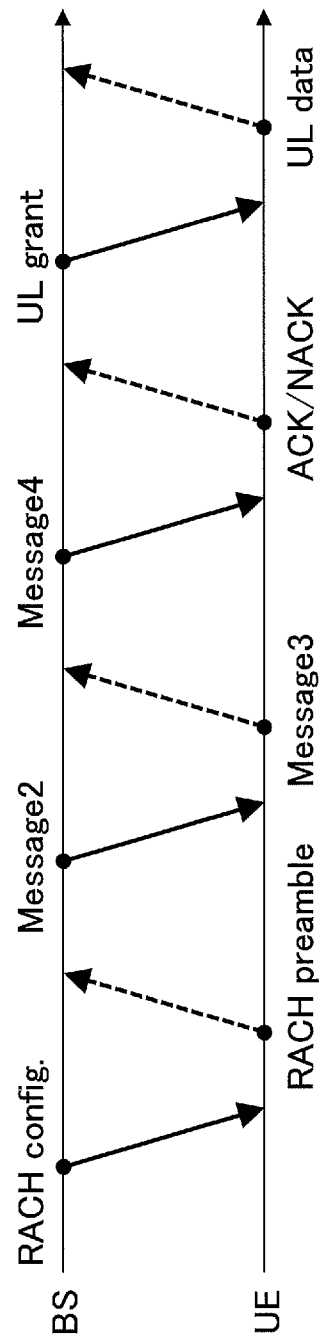

Namely, for the connection request signal transmitted from the user equipment 100, the transceiver 110 transmits the connection request signal generated by the signal processor 120 in the fixed uplink radio resources in the dynamic TDD. Specifically, the signal processor 120 generates the connection request signal for a connection with the base station 200 such as the RACH signal, and the transceiver 110 transmits the generated connection request signal to the base station 200 in the fixed uplink radio resources in the dynamic TDD. In this case, the base station 200 responds to the connection request signal received in the fixedly configured uplink radio resources, and performs a connection process with the user equipment 100, for example, in accordance with the contention-based RA procedure illustrated on the lower side of FIG. 5. The radio resources in which the user equipment 100 transmits the connection request signal are indicated by a physical control channel transmitted from the base station 200, a higher layer signal, or the cell residing information signal to be described below.

For the cell residing information signal transmitted from the base station 200, the transceiver 210 transmits the cell residing information signal generated by the signal processor 220 in the fixed downlink radio resources in the dynamic TDD. Specifically, the signal processor 220 generates the cell residing information signal for residing or being attached to the cell such as the synchronization signal, the broadcast signal, or the like, and the transceiver 210 transmits the generated cell residing information signal to the user equipment 100 in the fixed downlink radio resources in the dynamic TDD. In this case, the user equipment 100 resides or attaches to the cell based on the cell residing signal received in the fixedly configured downlink radio resources. The user equipment 100 may make an attempt to detect the cell residing information signal in all radio resources used for the uplink communication and radio resources in which the cell residing information signal is transmitted are separately indicated through a physical control channel transmitted from the base station 200 or a higher layer signal.

According to the first embodiment, when the same uplink/downlink pattern is used between the adjacent cells, it is possible to detect the cell residing information signal and/or the connection request signal with no cross link interference from the adjacent cell.

Next, mapping of cell residing information signal and the connection request signal to radio resources in the dynamic TDD according to a second embodiment of the present invention is described with reference to FIGS. 12 to 13. In the second embodiment, the cell residing information signal and/or the connection request signal are transmitted in the radio resources in which the communication direction can be dynamically controlled in the uplink/downlink patterns 1 to 3 in the dynamic TDD described above with reference to FIG. 5, whereas in the adjacent cell, a transmission signal is muted so that no crosslink interference occurs in the radio resources in which the cell residing information signal and/or the connection request signal are transmitted.

Figure 12:
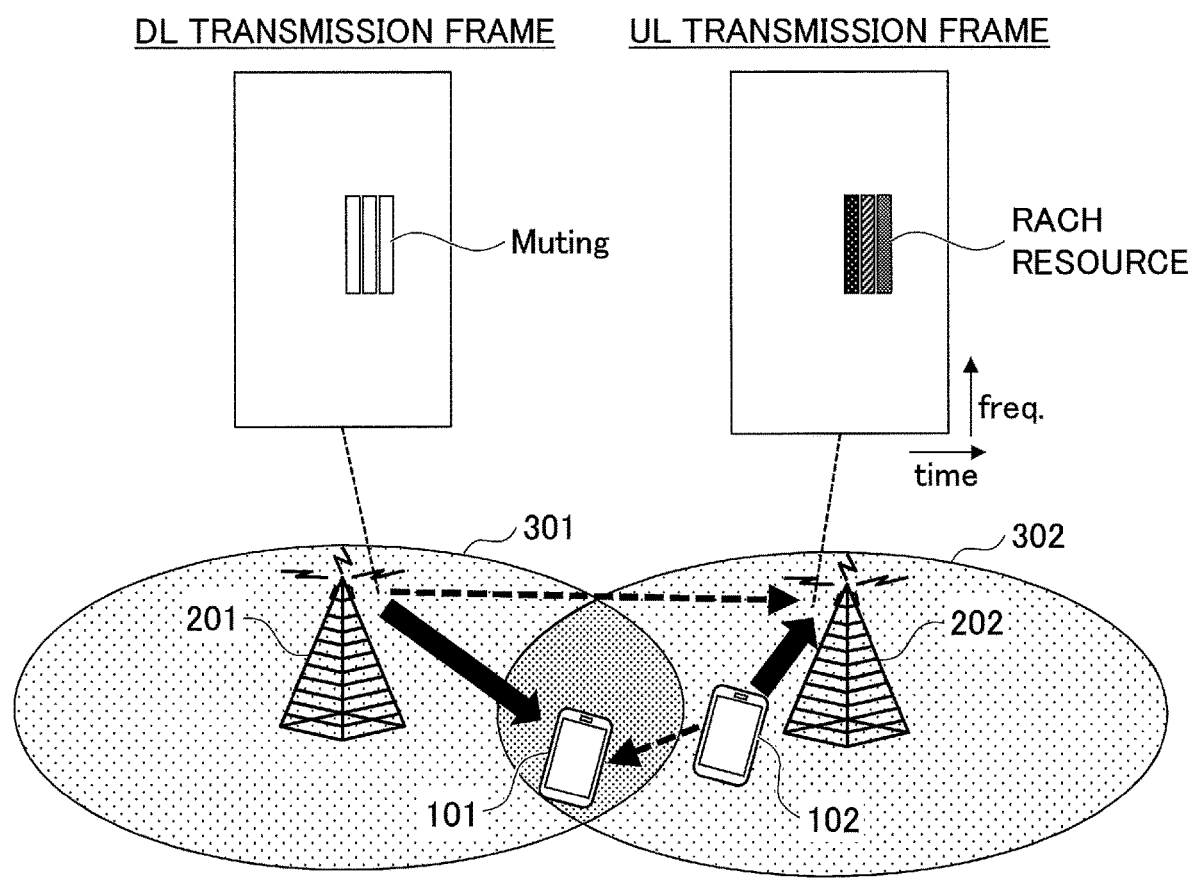
FIG. 12 is a schematic diagram illustrating mapping of a connection request signal in dynamic TDD according to a second embodiment of the present invention.

Namely, for the connection request signal transmitted from the user equipment 102, as illustrated in FIG. 12, the transceiver 110 transmits the connection request signal generated by the signal processor 120 in the radio resources muted in the adjacent cell 301. Specifically, the signal processor 120 generates the connection request signal for a connection with the base station 202 such as the RACH signal, and the transceiver 110 transmits the connection request signal to the base station 202 in the radio resources muted in the adjacent cell 301. At this time, the base station 202 mutes the corresponding radio resources in the adjacent cell 301 by notifying the base station 201 of the adjacent cell 301 of configuration information indicating the radio resources in which the user equipment 102 can transmit the connection request signal. As described above, an indication of the radio resources to be muted may be given from the base station 201 to the adjacent cell 301 through backhaul signaling or the like, or radio resources be used in the adjacent cell 301 may be stored in the base station 201 in advance. Here, the configuration information may indicate, for example, radio resources (a transmission timing, a transmission frequency band, or the like) which are secured for the user equipment 102 to transmit the connection request signal to the base station 202. Upon receiving the configuration information, in order to prevent the crosslink interference, the base station 201 of the adjacent cell mutes the downlink radio resources of its own cell corresponding to the radio resources indicated by the configuration information, that is, does not transmit the downlink signal (zero power transmission).

Accordingly, the RA procedure can be performed between the user equipment 102 and the base station 202 with no crosslink interference from the adjacent cell 301.

Figure 13:
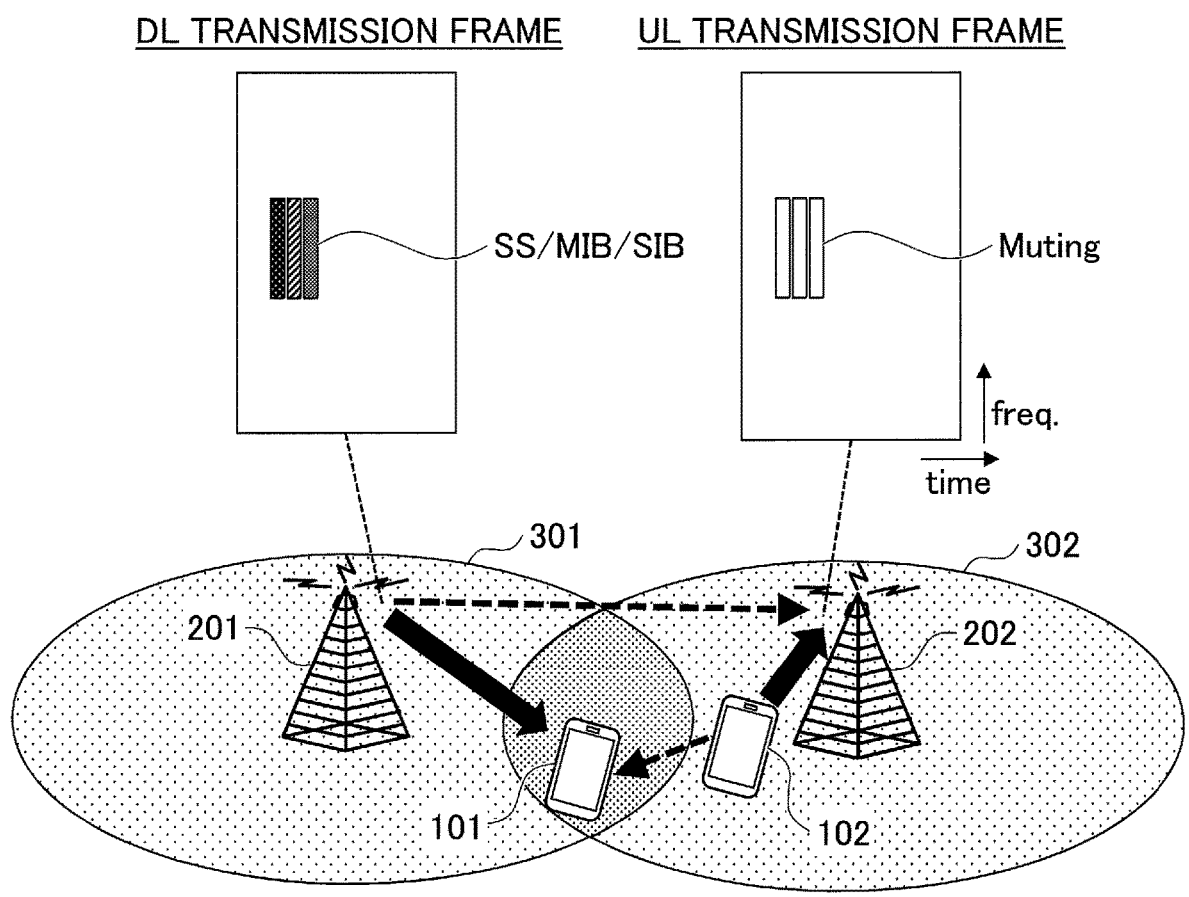
FIG. 13 is a schematic diagram illustrating mapping of a cell residing information signal in dynamic TDD according to the second embodiment of the present invention.

For the cell residing information signal transmitted from the base station 201, as illustrated in FIG. 13, the transceiver 210 transmits the cell residing information signal generated by the signal processor 220 in the radio resources muted in the adjacent cell 302. Specifically, the signal processor 220 generates the cell residing information signal for enabling the user equipment 101 to reside or to attach to the cell such as the synchronization signal (SS) or the broadcast signal (the MIB and the SIB), and the transceiver 210 transmits the generated cell residing information signal to the user equipment 101 in the radio resources muted in the adjacent cell 302. Furthermore, the transceiver 210 may notify the base station 202 of the adjacent cell 302 of the configuration information indicating the radio resources in which the cell residing information signal is transmitted (the transmission timing, the transmission frequency band, or the like). Upon receiving the configuration information from the base station 201, the base station 202 of the adjacent cell 302 generates muting information for muting the radio resources of its own cell corresponding to the radio resources indicated by the configuration information, and notifies the user equipment 102 of the muting information. The user equipment 102 of the adjacent cell 302 mutes the uplink radio resources on the basis of the received muting information, that is, does not transmit the uplink signal (zero power transmission).

The muting information may be notified to the user equipment 100 dynamically through the downlink control channel or the like or may be notified to the user equipment 100 in the RRC or the like in a semi-static manner.

Accordingly, the base station 201 can transmit the cell residing information signal to the user equipment 101 with no crosslink interference from the adjacent cell.

The above embodiments have been described in connection with the dynamic TDD, but the present invention is not limited thereto and may be applied to any communication scheme in which the uplink communication and the downlink communication are dynamically switched in the time domain. Further, the present invention may be applied to any communication scheme in which radio resources are dynamically switched to the uplink communication and the downlink communication such as dynamic FDD in which the uplink communication and the downlink communication are switched in the frequency domain or the full duplex.

For example, the cell residing information signal and the connection request signal may be transmitted in the same time resources. In other words, the cell residing information signal (the synchronization signal, the MIB, the SIB, or the like) and the connection request signal (the RACH signal or the like) may be transmitted in accordance with frequency division multiplexing (FDM). Here, transmission power of each channel may be increased. For example, in the same time resources, the user equipment 100 may transmit the connection request signal at a frequency band different from a frequency band at which the cell residing information signal is transmitted. Further, transmission timings of the cell residing information signal and the connection request signal may be individually set, and only when the transmission timings of the signals are the same, the user equipment 100 may transmit the connection request signal at a frequency band different from a frequency at which the cell residing information signal is transmitted at the same timing.

In the block diagrams used in the description of the above embodiment, the blocks of the functional units are illustrated. The functional blocks (configuring units) are implemented by an arbitrary combination of hardware and/or software. A device of implementing each functional block is not particularly limited. In other words, each functional block may be implemented by one device which is physically and/or logically combined or may be implemented by a plurality of devices, that is, two or more devices which are physically and/or logically separated and are directly and/or indirectly connected (for example, a wired and/or wireless manner).

Figure 14:
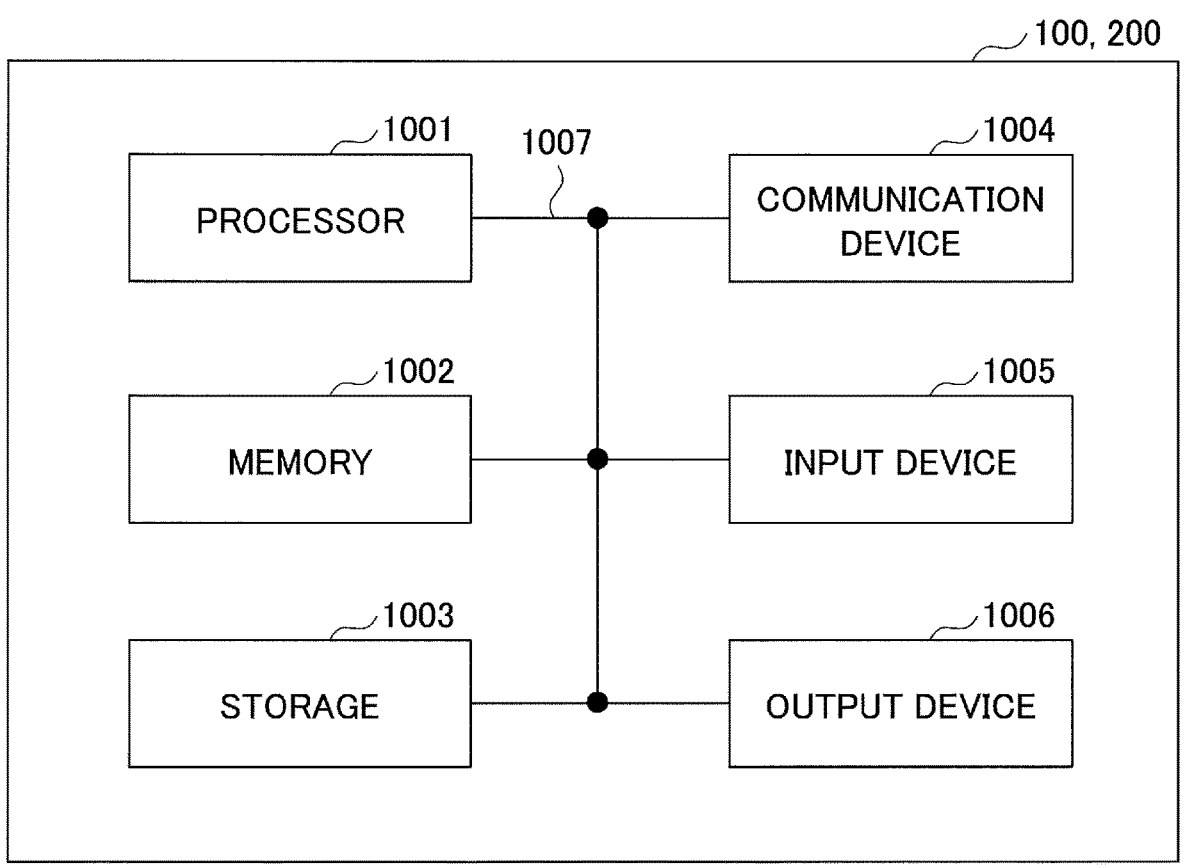
FIG. 14 is a block diagram illustrating a hardware configuration of each of a user equipment and a base station according to one embodiment of the present invention.

For example, each of the user equipment 100 and the base station 200 in one embodiment of the present invention may function as a computer that performs the process of the radio communication method of the present invention. FIG. 14 is a block diagram illustrating a hardware configuration of each of the user equipment 100 and the base station 200 according to one embodiment of the present invention. Each of the user equipment 100 and base station 200 may be physically configured as a computer device that includes a processor 1001, a memory 1002, a storage 1003, a communication device 1004, an input device 1005, an output device 1006, a bus 1007, and the like.

In the following description, the term "device" can be replaced with a circuit, a device, a unit, or the like. The hardware configuration of each of the user equipment 100 and base station 200 may be configured to include one or more devices illustrated in the drawing or may be configured without including some devices.

Each function in each of the user equipment 100 and base station 200 is implemented such that predetermined software (program) is read on hardware such as the processor 1001 and the memory 1002, and the processor 1001 performs an operation and controls communication by the communication device 1004 or reading and/or writing of data in the memory 1002 and the storage 1003.

For example, the processor 1001 operates an operating system and controls the entire computer. The processor 1001 may be configured with a central processing unit (CPU) including an interface with a peripheral device, a control device, an operation device, a register, and the like. For example, the baseband signal processor 104, the call processing unit 105, and the like may be implemented by the processor 1001.

Further, the processor 1001 reads a program (a program code), a software module, and data from the storage 1003 and/or the communication device 1004 out to the memory 1002, and performs various kinds of processes according to them. A program causing a computer to execute at least some of the operations described in the above embodiment is used as the program. For example, the process performed by each component of the user equipment 100 and the base station 200 may be implemented by a control program which is stored in the memory 1002 and operates on the processor 1001, or the other functional blocks may be similarly implemented. Various kinds of processes have been described as being performed by one processor 1001 but may be performed simultaneously or sequentially by two or more processors 1001. The processor 1001 may be implemented by one or more chips. The program may be transmitted from a network via an electric communication line.

The memory 1002 is a computer readable recording medium and configured with at least one of a read only memory (ROM), an erasable programmable ROM (EPROM), an electrically erasable programmable ROM (EEPROM), a random access memory (RAM), and the like. The memory 1002 is also referred to as a "register," a "cache," a "main memory (main storage device)," or the like. The memory 1002 can store programs (program codes), software modules, or the like which are executable for carrying out the radio communication method according to the embodiment of the present embodiment.

The storage 1003 is a computer-readable recording medium and may be configured with, for example, at least one of an optical disk such as a compact disc ROM (CD-ROM), a hard disk drive, a flexible disk, a magneto-optical disk (for example, a compact disk, a digital versatile disk, or a Blu-ray (registered trademark) disc, a smart card, a flash memory (for example, a card, a stick, or a key drive), a floppy (registered trademark) disk, a magnetic strip, and the like. The storage 1003 is also referred to as an "auxiliary storage device." The storage medium may be, for example, a database, a server, or any other appropriate medium including the memory 1002 and/or the storage 1003.

The communication device 1004 is hardware (a transmitting and receiving device) for performing communication between computers via a wired and/or wireless network and is also referred to as a "network device," a "network controller," a "network card," a "communication module," or the like. For example, each component described above may be implemented by the communication device 1004.

The input device 1005 is an input device that receives an input from the outside (such as a keyboard, a mouse, a microphone, a switch, a button, a sensor, or the like). The output device 1006 is an output device that performs an output to the outside (for example, a display, a speaker, an LED lamp, or the like). The input device 1005 and the output device 1006 may be integrally configured (for example, a touch panel).

The respective devices such as the processor 1001 or the memory 1002 are connected via the bus 1007 to communicate information with each other. The bus 1007 may be configured with a single bus or may be configured with different buses between the devices.

Further, each of the user equipment 100 and the base station 200 may be configured to include hardware such as a microprocessor, a digital signal processor (DSP), an application specific integrated circuit (ASIC), a programmable logic device (PLD), or a field programmable gate array (FPGA) or all or some of the functional blocks may be implemented by hardware. For example, the processor 1001 may be implemented by at least one of these pieces of hardware.

A notification of information is not limited to the aspect or embodiment described in this specification and may be given by any other method. For example, the notification of information may be given physical layer signaling (for example, Downlink Control Information (DCI), uplink control information (UCI)), higher layer signaling (for example, radio resource control (RRC) signaling, medium access control (MAC) signaling, broadcast information (master information block (MIB), system information block (SIB))), other signals, or a combination thereof. Further, the RRC signaling may be referred to as an "RRC message" and may be, for example, an RRC connection setup message, an RRC connection reconfiguration message, or the like.

Each aspect and embodiment described in this specification is applicable to LTE, LTE-A, SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), and systems using any other appropriate systems and/or next generation systems expanded on the basis of the systems.

The processing procedures, the sequences, the flowcharts, and the like of the respective aspects/embodiments described in this specification may be changed in order, provided that there is no contradiction. For example, the method described in this specification presents elements of various steps in an exemplary order and is not limited to a presented specific order.

In this specification, a specific operation that is supposed to be performed by the base station 200 may be performed by an upper node in some instance. In the network configured with one or more network nodes including the base station, various operations performed for communication with the terminal can be obviously performed by the base station and/or any network node other than the base station (for example, an MME, an S-GW, or the like is considered, but it is not limited thereto). The example in which the number of network nodes excluding the base station is one has been described above, but a combination of a plurality of other network nodes (for example, an MME and an S-GW) may be provided.

Information and the like can be output from the higher layer (or the lower layer) to the lower layer (or the higher layer). Information and the like may be input/output via a plurality of network nodes.

Input and output information and the like may be stored in a specific place (for example, a memory) or may be managed through a management table. Input and output information and the like may be overwritten, updated, or additionally written. Output information and the like may be deleted. Input information and the like may be transmitted to another device.

The determination may be made in accordance with a value (0 or 1) indicated by one bit, may be made in accordance with a Boolean value (true or false), or may be made by a comparison of numerical values (for example, a comparison with a value).

Each aspect/embodiment described in this specification may be used alone, may be used in combination, or may be switched in association with execution. Further, a notification of predetermined information (for example, a notification indicating "being X") is not limited to one which is performed explicitly and may be performed implicitly (for example, a notification of predetermined information is not given).

The present invention is described above in detail. It is obvious to those having skill in the art that the present invention is not limited to the embodiments described in this specification. The present invention can be implemented as modifications and alterations without departing from the gist and scope of the present invention defined by the scope of the claims. Accordingly, the description of this specification is intended to be exemplary and does not have any restrictive meaning to the present invention.

Software should be interpreted widely to mean a command, a command set, a code, a code segment, a program code, a program, a subprogram, a software module, an application, a software application, a software package, a routine, a subroutine, an object, an executable file, an execution thread, a procedure, a function, and the like regardless of whether software is called software, firmware, middleware, a microcode, a hardware description language, or any other name.

Further, software, commands, and the like may be transmitted and received via a transmission medium. For example, when software is transmitted from a web site, a server, or any other remote source using a wired technology such as a coaxial cable, a fiber optic cable, a twisted pair, or a digital subscriber line (DSL) and/or a radio technology such as infrared rays, a radio wave, or a microwave, the wired technology and/or the radio technology are included in a definition of a transmission medium.

Information, signals, and the like described in this specification may be indicated using any one of a variety of different techniques. For example, data, instructions, commands, information, signals, bits, symbols, chips, and the like which are mentioned throughout the above description may be indicated by voltages, currents, electromagnetic waves, magnetic particles, optical fields or photons, or an arbitrary combination thereof.

The terms described in this specification and/or terms necessary for understanding this specification may be replaced with terms having the same or similar meanings. For example, a channel and/or a symbol may be a signal. Further, a signal may be a message. Further, a component carrier (CC) may be referred to as a "carrier frequency," a "cell," or the like.

The terms "system" and "network" used in this specification are used interchangeably.

Further, information, parameters, and the like described in this specification may be indicated by absolute values, may be indicated by relative values from predetermined values, or may be indicated by corresponding other information. For example, radio resources may be those indicated by an index.

The names used for the above-described parameters are not limited in any respect. Further, mathematical formulas or the like using the parameters may be different from those explicitly disclosed in this specification. Since various channels (for example, the PUCCH, the PDCCH, and the like) and information elements (for example, the TPC or the like) can be identified by suitable names, the various names allocated to the various channels and the information elements are not limited in any respect.

The base station can accommodate one or more (for example, three) cells (which is also referred to as "sectors"). When the base station accommodates a plurality of cells, the entire coverage area of the base station can be partitioned into a plurality of small areas, and each small area can provide a communication service through a base station subsystem (for example, a small indoor base station remote radio head (RRH)). The term "cell" or "sector" refers to a part or all of the coverage area of the base station and/or the base station subsystem that performs communication service in the coverage. Further, the terms "base station", "radio base station," "eNB", "cell," and "sector" may be used interchangeably in this specification. The base station is also referred to as a "fixed station," a "Node B," an "eNode B (eNB)," an "access point," a "Femto cell," a "small cell," a "transmission point (TP)," a "transmission/reception point (TRP)," or the like.

A mobile station is also referred to as a subscriber station, a mobile unit, a subscriber unit, a radio unit, a remote unit, a mobile device, a wireless device, a radio communication device, a remote device, a mobile subscriber station, an access terminal, a mobile terminal, a radio terminal, a remote terminal, a handset, a user agent, a mobile client, a client, or other appropriate terms, depending on those having skill in the art.

The terms "determining" and "deciding" used in this specification may include a wide variety of actions. For example, "determining" and "deciding" may include, for example, events in which events such as calculating, computing, processing, deriving, investigating, looking up (for example, looking up in a table, a database, or another data structure), or ascertaining are regarded as "determining" or "deciding." Further, "determining" and "deciding" may include, for example, events in which events such as receiving (for example, receiving information), transmitting (for example, transmitting information), input, output, or accessing (for example, accessing data in a memory) are regarded as "determining" or "deciding." Further, "determining" and "deciding" may include, for example, events in which events such as resolving, selecting, choosing, establishing, or comparing are regarded as "determining" or "deciding." In other words, "determining" and "deciding" may include events in which a certain operation is regarded as "determining" or "deciding."

Terms "connected," "coupled," or variations thereof means any direct or indirect connection or coupling between two or more elements and may include the presence of one or more intermediate elements between two elements which are "connected" or "coupled." The coupling or the connection between the elements may be physical, logical, or a combination thereof. When used in this specification, two elements may be considered to be "connected" or "coupled" with each other using one or more electric wires, cables and/or a printed electrical connection or using electromagnetic energy such as electromagnetic energy having a wavelength in a radio frequency domain, a microwave region, or a light (both visible and invisible) region as non-limiting and non-exhaustive examples.

A reference signal may be abbreviated as RS and may be called a pilot, depending on a standard to be applied.

A phrase "on the basis of" used in this specification is not limited to "on the basis of only" unless otherwise stated. In other words, a phrase "on the basis of" means both "on the basis of only" and "on the basis of at least."

Any reference to an element using a designation such as "first," "second," or the like used in this specification does not generally restrict quantities or an order of those elements. Such designations can be used in this specification as a convenient method of distinguishing between two or more elements. Thus, reference to the first and second elements does not mean that only two elements can be adopted there, or first element must precede the second element in a certain form.

Further, "means" in the configuration of each of the above devices may be replaced with "unit," "circuit," "device," or the like.

"Include," "including," and variations thereof are intended to be comprehensive, similarly to a term "equipped with" as long as the terms are used in this specification or claims set forth below. Furthermore, the term "or" used in this specification or claims set forth below is intended not to be an exclusive disjunction.

A radio frame may be configured with one or more frames in the time domain. Each of one or more frames in the time domain is also referred to as a subframe. Further, the subframe may be configured with one or more slots in the time domain. Further, the slot may be configured with one or more symbols (OFDM symbols, SC-FDMA symbols, or the like) in the time domain. Each of the radio frame, the subframe, the slot, and the symbol indicate a time unit when signals are transmitted. The radio frame, the subframe, the slot, and the symbol may have different corresponding names. For example, in an LTE system, the base station performs scheduling to allocate radio resources (a frequency bandwidth, transmission power or the like usable in each mobile station) to each mobile station. A minimum time unit of scheduling may be referred to as a transmission time interval (TTI). For example, one subframe may be referred to as a TTI, a plurality of consecutive subframes may be referred to as a TTI, or one slot may be referred to as a TTI. The resource block (RB) is a resource allocation unit in the time domain and the frequency domain and may include one or more consecutive subcarriers in the frequency domain. In the time domain of the resource block, one or more symbols may be included, and one slot, one subframe, or one TTI may be used. Each of one TTI and one subframe may be configured with one or more resource blocks. The structure of the radio frame described above is merely an example, and the number of subframes included in the radio frame, the number of slots included in the subframe, the number of symbols and resource blocks included in the slot, and the number of subcarriers included in the resource block can be changed variously.

The embodiments of the present invention are described above in detail. However, the present invention is not limited to the specific embodiments described above, and various modifications and alterations may be made within the scope of the gist of the present invention set forth in claims.

This patent application is based on and claims priority to Japanese Patent Application No. 2016-215712 filed on Nov. 2, 2016, and the entire content of Japanese Patent Application No. 2016-215712 is incorporated herein by reference.

LIST OF REFERENCE SYMBOLS

10 radio communication system
100 user equipment
200 base station
110, 210 transceiver
120, 220 signal processor

The invention claimed is:

1. A terminal comprising:
    a receiver that receives information related to a configuration of a first radio resource in a first time interval in a Time Division Duplex (TDD) communication system;
    a controller that fixedly configures the first radio resource in the first time interval for an uplink communication; and
    a transmitter that transmits a random access preamble with the first radio resource configured for the uplink communication,
    wherein, in the first radio resource in the first time interval, only the uplink communication is allowed,
    wherein the receiver receives information indicating a fixed radio resource for receiving a synchronization signal and a broadcast signal, and, in the fixed radio resource for receiving the synchronization signal and the broadcast signal, only a downlink communication is allowed,
    wherein the information related to the configuration of the first radio resource in the first time interval is included in a signal received based on information indicated by the broadcast signal received in the fixed radio resource,
    wherein the first time interval of the first radio resource configured for the uplink communication is a time interval of less than 14 symbols within one slot, the one slot consisting of the 14 symbols,
    wherein, in a second radio resource in a second time interval that is configured for a downlink communication, the second time interval included in the one slot, the controller allows only the downlink communication,
    wherein the fixed radio resource is in a first mini-slot, and
    wherein the first time interval and the second time interval are comprised in a second mini-slot.

2. A communication method by a terminal, the method comprising:
    receiving information related to a configuration of a first radio resource in a first time interval in a Time Division Duplex (TDD) communication system;
    fixedly configuring the first radio resource in the first time interval for an uplink communication; and
    transmitting a random access preamble with the first radio resource configured for the uplink communication,
    wherein, in the first radio resource in the first time interval, only the uplink communication is allowed,
    wherein the receiving receives information indicating a fixed radio resource for receiving a synchronization signal and a broadcast signal, and, in the fixed radio resource for receiving the synchronization signal and the broadcast signal, only a downlink communication is allowed, wherein the information related to the configuration of the first radio resource in the first time interval is included in a signal received based on information indicated by the broadcast signal received in the fixed radio resource, wherein the first time interval of the first radio resource configured for the uplink communication is a time interval of less than 14 symbols within one slot, the one slot consisting of the 14 symbols, wherein, in a second radio resource in a second time interval that is configured for a downlink communication, the second time interval included in the one slot, only the downlink communication is allowed, wherein the fixed radio resource is in a first mini-slot, and wherein the first time interval and the second time interval are comprised in a second mini-slot.

* * * * *